United States Patent

[11] 3,535,998

| [72] | Inventors | George D. Perkins, and<br>David E. Workman, Pasadena, California |
|---|---|---|
| [21] | Appl. No. | 717,234 |
| [22] | Filed | March 29, 1968 |
| [45] | Patented | Oct. 27, 1970 |
| [73] | Assignees | Abe Vincent Cummings and<br>By direct and mesne assignments to<br>Bernard John Stankewicz<br>Solana Beach, and Andrew J. Zoldos,<br>Santa Fe, and George D. Perkins,<br>Pasadena, California a part interest to each |

[54] FOOD TREATING APPARATUS
10 Claims, 5 Drawing Figs.

[52] U.S. Cl. ............................................. 99/256,
128/216
[51] Int. Cl. .............................................. A23l 3/34
[50] Field of Search ................................... 99/256,
254, 255, 257; 107/1, 1(.1), 1(.4), 1(.7), 1(.9),
48(F); 27/21—24; 128/215—217, 264; 221/186,
263; 99/256

[56] References Cited
UNITED STATES PATENTS

| 1,684,865 | 9/1928 | Hansen et al. | 99/256 |
| 2,017,783 | 10/1935 | Clark | 128/264 |
| 2,187,687 | 1/1940 | Harper | 99/256 |
| 2,290,363 | 7/1942 | Stirton | 99/256UX |

Primary Examiner—William I. Price
Assistant Examiner—Arthur O. Henderson
Attorney—Jackson and Jones ABSTRACT: A food treating apparatus which has a tubular body adapted to receive a container storing a plurality of pellets having food treating ingredients. An elongated, normally closed probe is disposed adjacent an aperture of the body and is adapted to be inserted in the foodstuff. The container is constructed to selectively place one pellet in the probe which is deposited in the food by opening the probe after it has been inserted in the food and thereafter withdrawing the probe therefrom.

Patented Oct. 27, 1970
3,535,998
Sheet 1 of 2
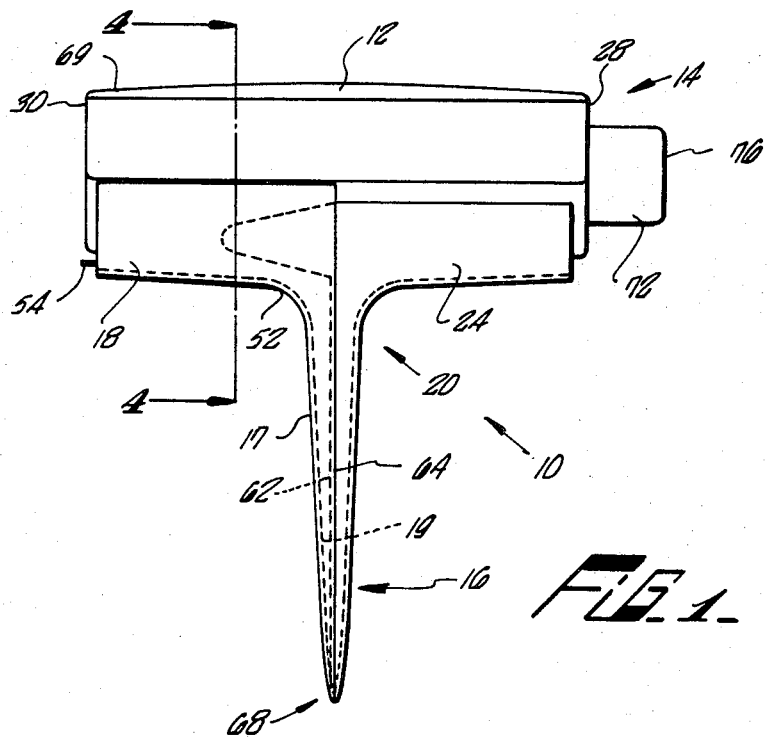
FIG. 1
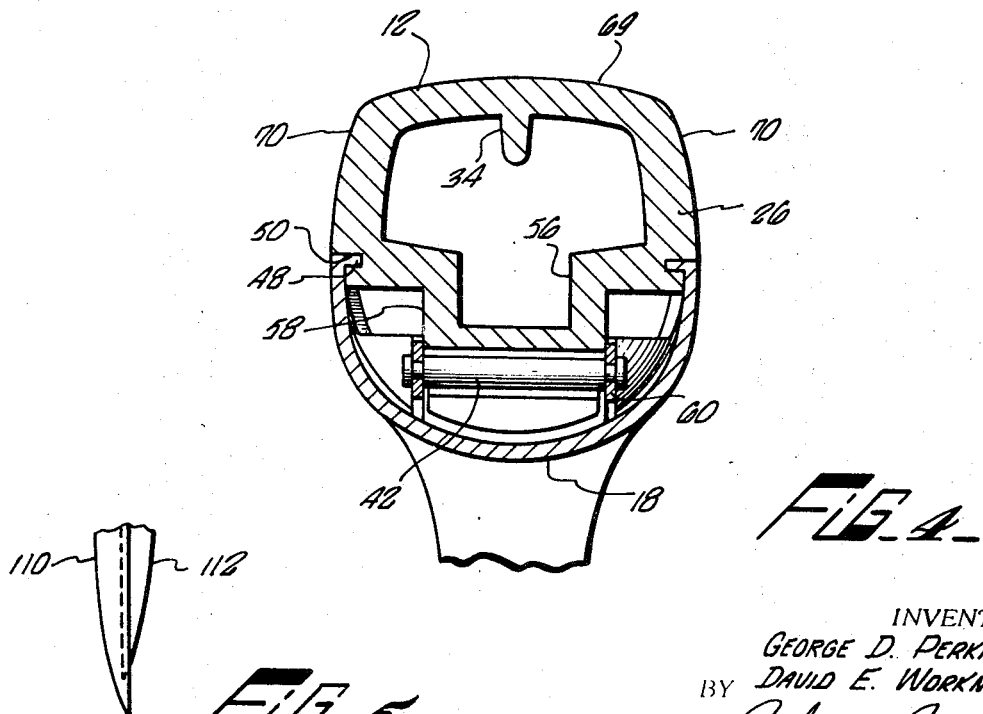
FIG. 4
FIG. 5
INVENTORS.
GEORGE D. PERKINS
DAVID E. WORKMAN
BY Jackson & Jones
ATTORNEYS INVENTORS.
GEORGE D. PERKINS
DAVID E. WORKMAN
BY
Jackson & Jones
ATTORNEYS

3,535,998

FOOD TREATING APPARATUS

RELATED PATENT APPLICATIONS

This application is related to and can be used for practicing the method disclosed in the copending, commonly owned patent application bearing Ser. No. 717,172, filed Mar. 29, 1968.

BACKGROUND OF THE INVENTION

1. Field of the Invention

This invention relates to food treating apparatus and more particularly to food treating apparatus capable of placing dehydrated pellets containing food treating ingredients into the interior of the food.

2. State of the Prior Art

In the past foods were flavored, tenderized, or otherwise treated in one of two ways. In accordance with the oldest method food treating ingredients are applied to exterior surfaces of the food. This method is simple and requires no special tools. Its effectiveness, however, is limited by the capability of the ingredients to penetrate the food. In some applications as, for example, in the treatment of bakery products with liquid flavorizers which are absorbed by the product, this method is not only the simplest, but also most satisfactory. When treating other foodstuffs such as meat, for example, the method is unsatisfactory since even the most modern and sophisticated flavoring and tenderizing ingredients are incapable of penetrating beyond a relatively narrow surface layer of the meat.

A second method for treating foods has therefore been suggested. According to it incisions are made which penetrate the meat and permit the flavoring or tenderizing ingredients to be placed within the body of the meat. This method has several shortcomings, particularly when liquid ingredients are used which have a tendency to ooze through the incisions to the exterior of the meat. The advantages from having them placed into the interior are easily lost, making the attempt a futile one. It is, moreover, difficult to place dehydrated or pulverized flavoring or tenderizing ingredients into the incisions. If the incision is small the ingredients stick to the walls of the incision and are difficult to be placed on the bottom of the incision. If, on the other hand, the incision is large enough and can be opened so that the ingredients can be placed on its bottom, the meat not only becomes unsightly but the many incisions disturb the desired homogeneity. This method of treating foodstuffs, and particularly meat, has thus been limited to placing solids, such as herbs, onions or garlic into relatively large incisions by pushing them into the incision and leaving a portion of it extend to the exterior of the incision. The process is slow and time consuming and often results in a mutilated cut of meat. Most importantly, however, its use is limited to a few applications wherein the ingredients are solid.

In the recent past, and as fully described in the above referred to, copending patent application, a new method for flavoring and tenderizing foodstuffs has been invented. In accordance with it dehydrated pellets having a predetermined amount of the desired ingredients are inserted into interior portions of the food. The pellets are inserted in a hollow probe which is forced into the interior of the foodstuff. Upon retraction of the probe the pellet remains in the foodstuff and there releases its flavoring or tenderizing agents.

In the prior art there are no instruments which are adapted to place the pellets into the interior of the food in an effective, efficient manner. Although the prior art discloses a number of injection devices used for placing substances underneath the skin of live animals, they are not adapted for placing flavoring pellets into the interior of meat that is to be treated for human consumption.

Principally, prior art injection devices employ tubular needles constructed of high-grade material, such as stainless steel similar to hypodermic needles, through which the particular substance is mechanically forced after the needle pierced the skin of an animal. Since these instruments are used on live animals they require a high degree of control to assure their proper operation and prevent harm to the health of the animal. This, of course, makes them expensive. Injection of pellets, particularly when the needles are relatively long, requires the conduit of the needle to be filled with pellets to avoid excessive travel lengths of the injection mechanism and its plunger. Once the conduit is filled with pellets it is difficult to remove them therefrom. This is acceptable where the same type of pellet is injected over and over again as in the treatment of live animals to stimulate their growth or behavior. If the pellets are frequently to be changed, as in the treatment of food where different flavoring ingredients are often used in the same food such as a cut of meat, the necessity of having to constantly replace the pellets in the needle is impractical, time consuming, and inconvenient. Moreover, inadvertent failure to remove all pellets before new ones are placed into the conduit may result in undesirable flavoring of the meat and actually reduce its tastiness.

SUMMARY OF THE INVENTION

Briefly the present invention provides an apparatus for injecting flavoring and tenderizing ingredients in dehydrated pellet form into interior portions of foodstuffs. The apparatus includes a tubular body which has an open end and an aperture disposed transversely to an axis of the body. Dispensing means include a container with an aperture arranged transversely to the axis. The container is mounted in the body and projects past the open end thereof. Spring means bias the apertures into disalignment. An elongated, normally closed probe is secured to the body in substantial alignment with the aperture in the body. Actuating means are further provided for selectively opening the probe.

Preferably, the pellets are of uniform size and each contains a predetermined quantity of a food treating ingredient. A plurality of such pellets are stored in the container and the aperture therein has a configuration to hold one pellet at a time. Upon alignment of the apertures a pellet drops into the probe and is retained therein until the actuating means open it. This can be repeated any number of times to increase or decrease the amount of flavoring or tenderizing ingredients placed into the food.

This apparatus is simple and can be mass-produced from inexpensive material such as plastic, thereby assuring its availability to the general public at lowest costs. The containers, which are removable from the body and interchangeable, can be filled with pellets having different flavoring or tenderizing ingredients. A user of the apparatus can have a ready supply of a multitude of such containers, each storing pellets with different ingredients. When a food such as a cut of meat requires flavoring or tenderizing the container with the desired pellets is placed in the body of the apparatus and the probe is pushed into the interior of the meat. After placing the desired number of pellets in the probe the latter is opened and the pellets are deposited inside the meat. The probe is withdrawn and additional pellets can then be placed at other parts of the meat.

This apparatus not only enables the quick and convenient treatment of food but its simplicity enables it to be maintained clean with a minimum effort. The likelihood that the apparatus, particularly the probe, is maintained in a sanitary condition is thereby substantially enhanced. Moreover, the containers are constructed to prevent contamination of the pellets while in storage, thereby further contributing to the cleanliness of the apparatus.

BRIEF DESCRIPTION OF THE DRAWINGS

FIG. 1 is a plan view of a food treating apparatus constructed in accordance with the present invention;

FIG. 4 is a fragmentary side view, in section, taken along lines 4–4 of FIG. 1; and FIG. 5 is a fragmentary plan view, similar to FIG. 1, showing an alternate construction of a probe of this apparatus.

DESCRIPTION OF THE PREFERRED EMBODIMENTS

Figure 3:
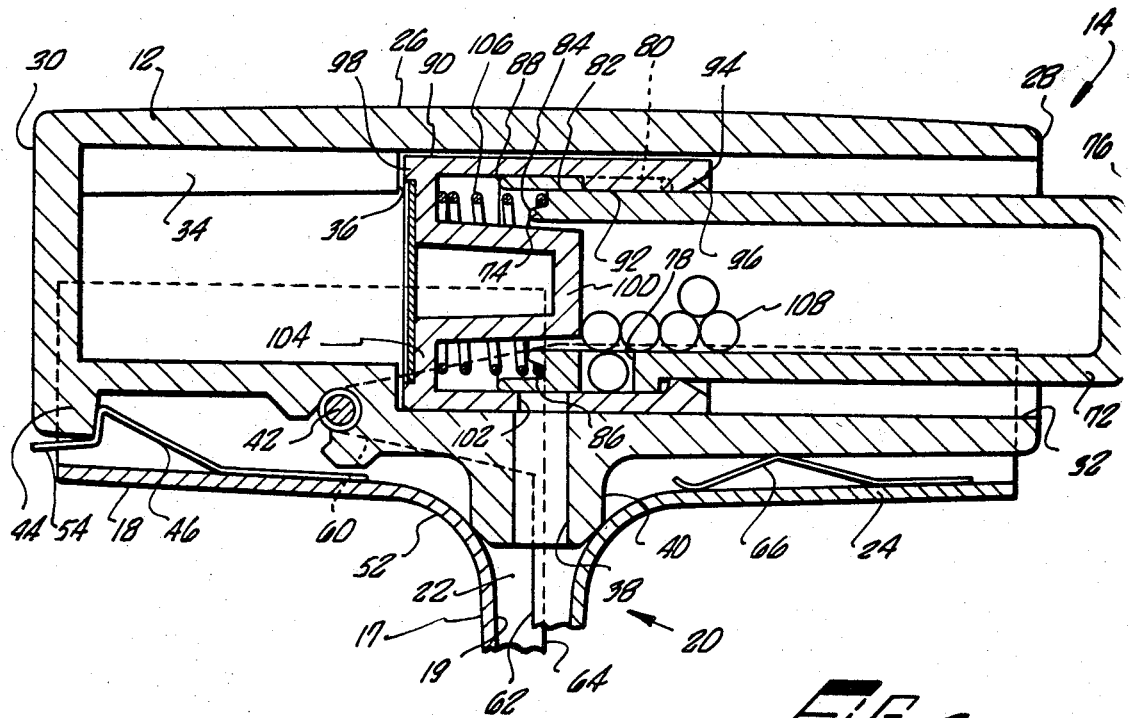
FIG. 3 is a fragmentary plan view, in section, taken along lines 3–3 of FIG. 2.

Referring first to FIG. 1, a food treating apparatus 10 constructed in accordance with the present invention includes an elongated, tubular body 12 and, movably disposed therein, a dispensing mechanism 14. An elongated, normally closed split probe 16 extends away from the body transversely to its longitudinal axis. The probe includes a stationary section 17 which is integrally constructed with a holding portion 18 disposed adjacent and parallel to the body and an integral trough-shaped portion 19 extending away from the body 12. It defines a trough-shaped passage between the body and an end of the stationary probe section. The probe 16 also includes an elongated, pivotally mounted movable probe section 20 disposed adjacent the open side of the trough-shaped passageway. The movable section 20 has a configuration to nest in the trough-shaped portion 19 and to define a tubular conduit 22. A handle 24 is preferably integrally constructed with the movable probe section 20, is disposed parallel to and adjacent the body 12, and extends away from the probe in a direction opposite to the holding portion 18.

Figure 2:
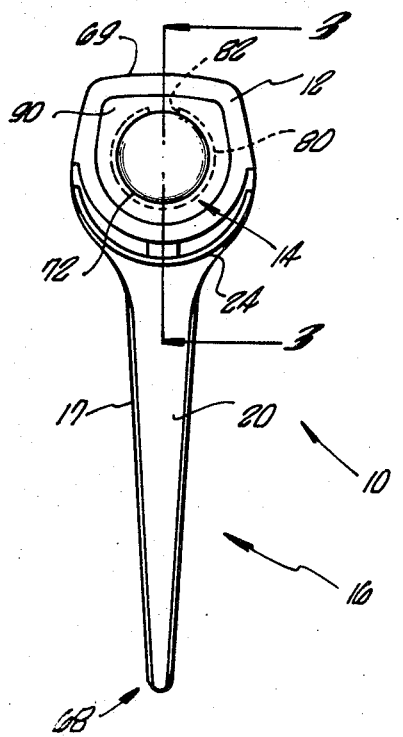
FIG. 2 is a side view of the apparatus shown in FIG. 1.

The body 12, which is preferably injection molded of a thermosetting plastic material, has, as best seen in FIG. 3, a tubular configuration and is defined by a circumferential wall 26, an open end 28 and a closed end 30. An interior portion 32 has an oblong configuration, as best seen in FIG. 2, and extends from the open end towards the closed end of the body. The body includes an inwardly projecting axially disposed fin 34 (see FIG. 4) which defines an inner end 36 of the oblong conduit 32.

The circumferential wall 26 includes a transverse, preferably circularly shaped aperture 38 about midway between the open and the closed ends. The portion of the wall adjacent the aperture includes a protrusion 40 extending parallel to the aperture and in engagement with stationary portion 17 of the probe 16. It positions the probe such that the tubular conduit 22 is in substantial alignment with the aperture 38.

A pivot pin 42 is preferably molded into the body 12 and positioned between the protrusion 40 and the closed end 30 of the body. The pivot pin is constructed of metal and, as an alternative to molding it into the body, may be suitably secured thereto in a conventional manner. See FIGS. 3 and 4.

The closed end 30 of the body further includes a protrusion 44 projecting in the direction of the protrusion 40 for engaging a spring clip 46 mounted on holding portion 18 of the stationary probe section 17. The spring clip is biased towards the body 12 and into engagement with the protrusion 44, thereby preventing the stationary probe section from becoming disengaged from the body 12. The holding portion 18 includes a pair of laterally spaced flanges 48 (FIG. 4) which slidably engage a pair of grooves 50 in the body 12. The grooves are arranged parallel to the axis of the body. To install the probe section 17 on the body the flanges 48 are aligned with the grooves 50 and the probe is moved axially until a transitional section 52 engages the protrusion 40. At that point the spring clip is in engagement with the protrusion 44, the conduit 22 is aligned with aperture 38, and the probe section 17 is demountably secured to the body. To remove the probe section 17 an extension 54 of the spring clip which projects past the closed end 30 of the body is depressed until the spring clip and the protrusion are disengaged. To permit the depression of the extension the holding portion 18 is constructed such that a free space is maintained between it and the protrusion 44.

Referring to FIGS. 3 and 4, the transverse pivot pin 42, which is mounted adjacent a narrowed section 56 of the body, projects past sides 58 of that section and engages a pair of laterally spaced pivot arms 60 of the movable probe section 20. Preferably the pivot pin includes annular grooves and the end of the pivot arms are slit to enable their mutual engagement and prevent the arms from moving axially along the pin. The pivot arms are integrally constructed with both the movable probe section and the handle 24 and they are arranged so that when the movable probe section is in engagement with the stationary section 17 longitudinal edges 62 of the movable section are substantially parallel to longitudinal edges 64 of the probe section 17. A leaf spring 66 is mounted on the handle 24, faces and engages the body 12 and biases the movable probe section 20 into engagement with the trough-shaped portion 19 of the probe section 17. When a force is applied to the handle 24 to pivot it in a counterclockwise direction about pin 42, as viewed in FIG. 3, the two section 17 and 20 of the probe 16 are moved apart. The movable probe section thus acts as self-closing means for the conduit 22 which are selectively opened by operating the handle.

The ends of both the stationary and movable probe sections are dished inwardly and close the tubular conduit 22 at its end remote from the body 12. At the same time the dished-in ends define a pointed end 68 capable of piercing foodstuff such as a cut of meat (not shown). Alternative constructions of the probe are, of course, possible. For example, both can be made pivotable. For brevity, however, such alternatives are not further described herein.

The body 12 has a relatively flat top surface 69 and sides 70 which fall off steeply therefrom. The handle 24 and the holding portion 18 have arcuate cross sections (shown in FIG. 4). The surface 69 of the body together with sides 70 and the handle and the holding portion thereby form a comfortable grip for an operator's hand.

Referring to FIGS. 2 and 3, the dispensing mechanism includes a container or bottle 72 having an open end 74, a closed end 76, and an aperture 78 of a configuration similar to that of aperture 38 in the body walls 26. The aperture 78 is arranged traversely of the longitudinal axis of the container 72. The exterior circumference of the container includes an enlarged portion 80 adjacent the open end an axial groove 82 extending from the open end to the end of the enlarged portion 80 facing the closed end. A face 84 of the container includes an annular groove 86 and an annular protrusion 88 having an outer diameter which equals that of the enlarged portion 80 and which projects beyond the face 84.

A closure 90 has an oblong configuration which is complementary to the oblong configuration of the body conduit 32 and an inner diameter slightly greater than the diameter of the enlarged portion 80 of the container 72. An axial tab or protrusion 92 projects from the inner side of the closure and has a width slightly less than the width of the axial groove 82 in the container. It slides axially in the groove and maintains the closure in alignment with the container.

An end 94 of the closure facing towards the closed end 76 of the container includes an annular, inwardly projecting protrusion 96 which engages the enlarged portion 80 of the container. The protrusion and the enlarged portion limit the axial movement of the closure relative to the container in a direction from the closed towards the open end.

Another end 98 of the closure defines a coaxial plug 100 which has a lesser diameter than the inner diameter of the container and which is of a length equal to a distance between the inner end 36 of the oblong hole 32 and an end of the aperture 38 in body wall 26 closest to the open end 28 of the body 12. When the closure is disposed in the hole 32, the plug thereby fully covers the aperture in the body wall.

The closure 90 further includes an aperture 102 which is coaxial with aperture 38 and aligned with the aperture 78 in the direction of the axis of the container 72. It is further positioned to be axially off-set from aperture 78 when the annular protrusion 96 engages the enlarged portion 80 of the container. If the closure is moved relative to the container such that its end wall 104 is in engagement with the annular protrusion 88 the two apertures are aligned.

A helical compression spring 106 is mounted between the container 72 and the end wall 104 of the closure 90 and has an end supported in the annular groove 86 on the face 84 of the container. It biases the closure and the container apart until the annular protrusion 96 engages the enlarged portion 80 of the container. In this position the aperture 78 communicates directly with the interior of the container without interference from plug 100. At the same time the container projects past the open end 28 of the body 12 a distance which is greater than the distance between the end wall 104 and the annular protrusion 88. An operator can depress the closed end 76 of the container while it projects past the body. Full depression of the container aligns aperture 78 with apertures 38 and 102 in the body wall and the closure.

To use the apparatus for placing flavoring and tenderizing agents into food, say a cut of meat, a bottle 72 containing a plurality of dehydrated uniformally shaped and preferably spherical pellets 108 is inserted into the interior hold 32 of the body. The apparatus is held to maintain the probe in a substantially vertical position and one of the pellets drops into the aperture 78 of the container. The aperture is of a length so that no more than one pellet can be present in it. Thereafter the operator depresses the container and moves it into the body 12 until the annular protrusion 88 engages the end wall 104 of the closure. The aperture 78 is now aligned with apertures 38 and 102 and the pellets drops into the tubular conduit 22 of the probe 16. It is retained within the probe since the spring 66 biases the movable probe section 20 into engagement with probe 16, thereby closing the end 68 of the probe.

While the apertures are in alignment the inwardly projection plug 100 prevents additional pellets 108 from dropping into the tubular conduit 28. If more pellets are desired to obtain a greater flavoring or tenderizing effect the container is released to enable spring 106 to move it axially until the annular protrusion 96 engages the enlarged portion 80. Another pellet enters the aperture 78 and can be transferred to the tubular conduit 28. This can be repeated any desired number of times.

Next, the operator positions the pointed end of the probe at the location on the meat at which the flavoring or tenderizing agents are to be inserted. With his thumb placed adjacent the closed end 76 of the container, his palm against the flat surface 69 of the body 12, and his fingers grasping the handle 24 and the holding portion 18, he can exert a powerful force in the direction of the probe 16. The pointed end 68 of the probe pierces the meat and the movement is continued until the desired depth is reached. There the operator contracts his fingers grasping the handle 24 to pivot it about the pin 42 in a counterclockwise direction, as viewed in FIG. 3. The movable probe section 20 is thereby moved away from the stationary probe section 17, the end 68 is opened, and the pellets disposed in the tubular conduit 22 can drop downwardly until they rest on the meat in which the probe is disposed. While the operator maintains the probe in an open position he retracts the apparatus and pulls it out of the meat, thereby enabling all pellets to leave the tubular conduit and become embedded in the meat. The just described operation is performed at all locations where flavoring or tenderizing agents are to be inserted.

This same operation can be repeated to insert additional, or different flavoring or tenderizing ingredients into the meat. To assure that the correct quantity of the desired ingredient is inserted, pellets containing only the same amount and type of ingredients are stored in each container 72. Thus, to place other ingredients in the meat the container just used is replaced by another one and the operation is repeated.

After its use, the containers are removed from the hole 32 of body 12 and are suitably stored. The outwardly projecting extension 54 of spring clip 46 is depressed and the stationary probe section 17 together with the handle 24 is removed from the body to facilitate its cleaning. While the stationary probe section is removed from the body the movable section 20 is easily accessible for cleaning. Thereafter the apparatus is reassembled and ready for use again.

Referring to FIG. 5, another embodiment of this invention includes a stationary probe section 110 which is slightly longer than a movable probe section 112. In all other respects the apparatus is identical to the one just described. This embodiment is particularly desirable for use in conjunction with relatively tough and stringy food which can become wedged between the probe sections adjacent the end 68 (shown in FIG. 1) when the probe is inserted in the food. While the probe is inserted in the food the movable section 20 can be pivoted about pin 42, thereby opening the probe and enabling the pellets to escape from the tubular conduit 22. The embodiment (shown in FIG. 5) substantially eliminates the possibility of even the toughest and stringiest foodstuffs from becoming wedged between the probe sections. Possible accidental loss of pellets retained in the tubular conduit of the probe while the probe is being inserted in the food is thereby practically eliminated.

We claim:

1. Apparatus for placing flavoring and tenderizing pellets into foodstuffs, the apparatus comprising:
   a. a tubular body having at least one open end and an aperture disposed transversely to the longitudinal axis of the body;
   b. dispensing means including a container having a longitudinal axis and an aperture arranged transversely to the longitudinal axis of the container, the container being disposed in the body and projecting past the open end thereof to permit relative movement between the container and body for aligning said apertures;
   c. spring means for biasing the apertures into misalignment;
   d. an elongated, normally closed tubular probe secured to the body in substantial alignment with said aperture in the body; and
   e. actuating means for selectively opening the probe.

2. Apparatus according to claim 1 wherein the probe includes a stationary and a movable section and wherein the actuating means include handle means adjacent the body and connected with the movable section, and wherein the sections of the probe define a pointed, closed probe end remote from the body adapted to pierce the foodstuff.

3. Apparatus according to claim 2 wherein the handle is pivotally mounted adjacent and parallel to the body and including a spring for biasing the movable section toward the stationary section.

4. Apparatus according to claim 3 wherein the aperture in the body is located about midway between the ends of the body, the handle is located between the body aperture and one end of the body, and wherein the probe includes a holding member disposed adjacent and parallel to the body between the body aperture and the other end of the body.

5. Apparatus according to claim 1 wherein the probe is demountably secured to the body and defines a pointed end adapted to pierce the foodstuff when forced into the foodstuff in a direction parallel to the probe.

6. Apparatus according to claim 1 wherein the aperture in the container has a configuration to hold one pellet and including means for preventing a pellet from entering the container aperture when the apertures are in alignment with each other.

7. In an apparatus for placing pellets including food treating ingredients into foodstuffs, the combination which comprises:
   a. a body having an aperture of a size sufficient to pass a pellet therethrough;
   b. an elongated probe secured to the body for insertion into foodstuff while the body remains on the outside thereof, a free end of the probe remote from the body having biasing means in engagement therewith for biasing said free end into a closed position; and
   c. manually operable means for selectively opening the free end of the probe to provide an opening aligned with the tubular axis of the probe for depositing a pellet in the foodstuff and means disposed within the body for selectively dispensing pellets into said passage, whereby one or more pellets may be deposited with the probe in one position in the foodstuff.

8. In an apparatus for placing pellets including food treating ingredients into foodstuffs, the combination which comprises:
   a. a substantially tubular body adapted to receive dispensing means, the body having a longitudinal axis and an aperture of sufficient size to pass a pellet therethrough disposed transverse to said longitudinal axis;
   b. an elongated probe secured to the body and defining a conduit in substantial alignment with the aperture, the probe being comprised of a first and second portion secured to the body and movable relative to each other at least adjacent a free end of the probe, the portions of the probe having a configuration to close the conduit when the portions are adjacent each other, the probe portions further including gripping portions substantially parallel to the longitudinal axis of the body, the body and the gripping portions having a configuration and being arranged such that an operator can grasp the apparatus with one hand, exert a force in the direction of the probe, and move at least one probe portion relative to the others to open said conduit; and
   c. means for biasing the probe portions towards each other.

9. Apparatus for placing pellets including food treating ingredients into foodstuffs comprising:
   a. a body adapted to receive dispensing means, the body having an aperture of a size sufficient to pass a pellet therethrough;
   b. an elongated probe secured to the body and defining a conduit in substantial alignment with the aperture, the probe being comprised of a first and a second portion secured to the body and movable relative to each other at least adjacent a free end of the probe, the first portion being stationary and defining a trough-shaped passage between the body and the free end of the probe, the second portion being pivotally narrower than the first portion and arranged to nest in the trough-shaped passage when the portions are in the closed position, and means for biasing the probe portions towards each other.

10. Apparatus according to claim 9 wherein one portion of the probe extends past an end of the other portion in a direction parallel to and transverse to said conduit.